UNITED STATES PATENT OFFICE.

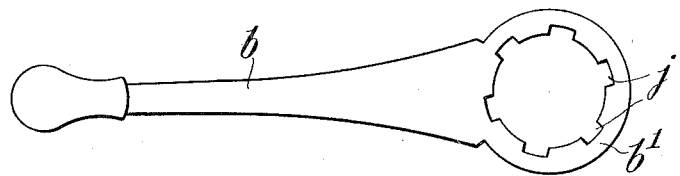
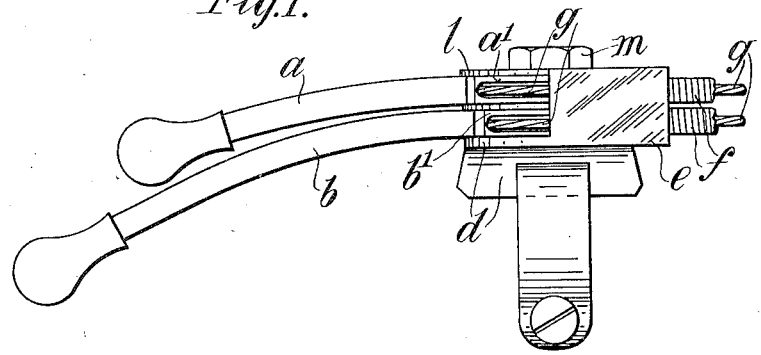
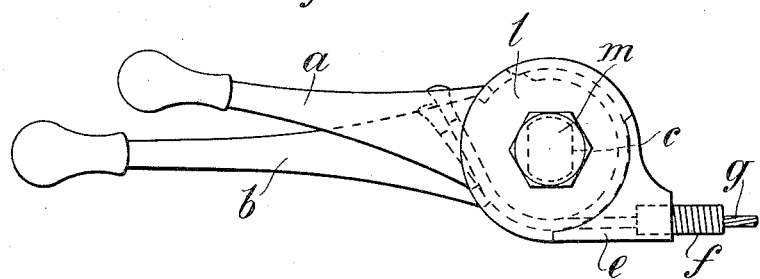
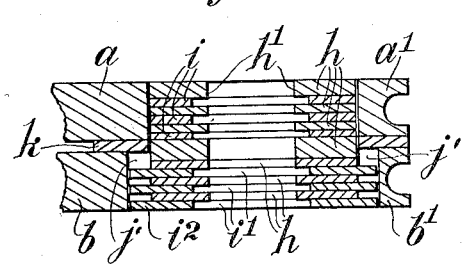
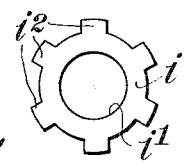
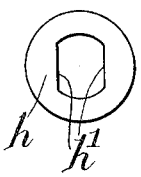

GEORGE FREDERICK LARKIN, OF HARRINGAY, ENGLAND.

CONTROL-LEVERS FOR VEHICLES.

1,088,595.

Specification of Letters Patent. Patented Feb. 24, 1914.

Application filed November 13, 1911. Serial No. 660,101.

*To all whom it may concern:*

Be it known that I, GEORGE FREDERICK LARKIN, a subject of His Majesty the King of England, residing at 96 Rutland Gardens, Harringay, in the county of Middlesex, Kingdom of England, have invented certain new and useful Improvements in Control-Levers for Vehicles, of which the following is a specification.

This invention relates to improvements in control levers for use on or in connection with cycles, motor cycles, motor vehicles and the like and it refers more particularly though not exclusively, to that class of device in which one, two or more control levers are mounted or superposed on a common fulcrum pin. Heretofore some difficulty has been experienced in providing a friction grip lever of this type wherein the friction can be nicely adjusted according to requirement or in which the movement of one lever will not interfere with or move the adjacent lever or levers.

The present invention is illustrated in the accompanying drawings in which:—

Figure 1 is a side elevation of a two-armed control device; Fig. 2 is a plan of same; Fig. 3 is a detail plan of one of the levers; Fig. 4 is an enlarged sectional view through the friction disks; and Figs. 5 and 6 are plan views of a pair of said disks.

Now, according to the arrangement shown and as applied to a pair of levers $a$ $b$ for use chiefly in connection with Bowden mechanism, I pivot the levers one above the other about a central pivot pin $c$ projecting from a suitable base piece $d$ which may also form the stop or abutment $e$ for the outer Bowden members $f$. The levers $a$ and $b$ terminate at their ends in circular or segmental pulley heads consisting of disks or annular rings $a'$, $b'$, around the periphery of which the inner transmission wires $g$ are wound upon their rotation. The levers do not directly pivot upon the central pin $c$ but are arranged concentrically thereon by means of a plurality of friction disks $h$, $i$, the members $h$ of which are alternately locked to the central pin $c$ by forming flats $h'$ thereon and the members $i$ to the inner circumference of the pulley or lever rings $a'$ $b'$. Thus one friction disk or ring $h$ will be in the form of a washer with a flattened central hole to correspond with the shape of the central pivot pin $c$ and the other $i$ in the form of a disk or ring having a circular hole $i'$ for rotating on the pivot pin $c$ and external interlocking projections $i^2$ with engaging key ways or slots $j$ in the inside hollow surface of each of the lever rings $a'$ $b'$. Between said levers or between each pair where more than three are employed a non-rotating disk $k$ of increased diameter which is locked to the base piece $d$ is provided, and on the outside of the outer or topmost lever another similar disk $l$ is arranged which latter is also preferably fixed as regards rotation to the base piece and held down by means of a suitable tightening nut $m$ which also serves for the adjustment of the friction of the levers $a$ and $b$. By this means I am enabled to provide a simple and effective lever control, the friction upon which can be readily adjusted, and in which either lever can be operated without causing movement of or interfering with the other or adjacent lever or levers as the case may be.

It will be observed that in Fig. 4 the section is taken through the lower lever $b$ at the recesses $j'$ while in the case of the upper lever $a$ it is taken through the circular part, but in both cases the disks $h$ are shown in section through the flattened part $h'$.

From the foregoing it will be apparent that I have produced a compact and efficient control lever. The arrangement of the control lever renders it possible to have each independent lever consist of as many alternately arranged non-rotatable and rotatable friction disks or members $h$ and $i$, as desired, which together with the clamping nut $m$ for varying the pressure between and holding the friction members together insures that all wear between the friction members can be taken up, and that a control lever of the desired strength can be provided.

The manner of attaching the levers to their respective rotating members $i$ by having the members fit into the apertures in the heads or rings of the levers is an important feature, in that the levers do not add to the thickness of the device, and also the manner of connecting the levers to the rotating members insures that the levers will exert full power on the rotating members and will not become accidentally displaced but can be readily removed or separated when desired. Further the mounting of the independent control levers directly upon each other on a common fulcrum pin $c$ with their non-rotating members next to each other, together with a single clamping means for varying the pressure on all the levers at the same time, is very advantageous, since it insures equal pressure on the friction members of each lever, and still permits of each lever being operated entirely independently and without interference from the other or others, depending as to whether two or more independent levers are associated together.

What I claim and desire to secure by Letters Patent of the United States is:—

A control device of the class described including a base, a fixed pivot pin projecting from the base, a plurality of control levers superimposed on the fixed pivot pin and provided with integral pulley segments having openings, movable and fixed friction plates contained within the openings of the pulley segments and connected, respectively, with the levers and with the fixed pin, means mounted on the outer portion of the pin for simultaneously adjusting the friction plates, and flexible transmission connections attached to the levers and arranged to be wound on the peripheries of the pulley segments.

In testimony whereof I have hereunto set my hand in the presence of two subscribing witnesses this third day of November 1911.

GEORGE FREDERICK LARKIN.

Witnesses:
J. S. WITHERS,
C. T. BLAKEY.